United States Patent
Chung et al.

(10) Patent No.: US 6,359,850 B1
(45) Date of Patent: Mar. 19, 2002

(54) OPTICAL PICKUP HAVING CATADIOPTRIC OBJECTIVE LENS

(75) Inventors: Chong-sam Chung; Chul-woo Lee, both of Sungnam; Kun-ho Cho; Yong-Hoon Lee, both of Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/179,406

(22) Filed: Oct. 27, 1998

(30) Foreign Application Priority Data

Apr. 14, 1998 (KR) .......................................... 1998-13317

(51) Int. Cl.7 ................................................. G11B 7/00
(52) U.S. Cl. .............................. 369/112.01; 369/112.23
(58) Field of Search ...................... 369/112, 13, 44.23, 369/110; 359/728, 727, 724, 565, 566, 351, 366, 365; 382/100; 347/258

(56) References Cited

U.S. PATENT DOCUMENTS

| | | | |
|---|---|---|---|
| 4,866,694 A | * 9/1989 | Korth | 369/44.12 |
| 5,042,928 A | * 8/1991 | Richards | 359/728 |
| 5,125,750 A | 6/1992 | Corle et al. | 363/43 |
| 5,689,480 A | 11/1997 | Kino | 369/14 |
| 5,774,569 A | * 6/1998 | Waldenmaier | 382/100 |
| 5,793,407 A | * 8/1998 | Park et al. | 347/258 |
| 5,796,520 A | * 8/1998 | Maruyama | 359/565 |
| 5,841,574 A | * 11/1998 | Willey | 359/351 |
| 5,883,872 A | * 3/1999 | Kino | 369/112 |

FOREIGN PATENT DOCUMENTS

| | | |
|---|---|---|
| EP | 0 294 902 A1 | 12/1988 |
| EP | 0 766 115 A1 | 4/1997 |
| JP | 63-313329 | 12/1988 |
| JP | 6-267105 | 9/1994 |

* cited by examiner

Primary Examiner—Thang V. Tran
Assistant Examiner—Kim-Kwok Chu
(74) Attorney, Agent, or Firm—Staas & Halsey LLP

(57) ABSTRACT

An optical pickup in which a light receptor and a light transmitter are integrated with a catadioptric objective lens. The optical pickup includes a unit for emitting laser light to a recording medium and detecting the light reflected from the recording medium. The catadioptric objective lens includes a first reflective area for reflecting the light incident from the unit, a focusing area for focusing the light incident from the unit as a focused spot, and a second reflective area for reflecting the light reflected from the first reflective area toward the focusing area. The first reflective area and the focusing area form a first surface of the catadioptric objective lens while the second reflective area is a part of a second surface of the catadioptric objective lens located in the vicinity of the unit. The light from the unit is incident to the catadioptric objective lens via portions of the second surface other than the second reflective area The optical pickup uses compact and light-weight components creating a thinner optical pickup suitable for use in slim devices such as notebook computers.

34 Claims, 1 Drawing Sheet

OPTICAL PICKUP HAVING CATADIOPTRIC OBJECTIVE LENS

CROSS-REFERENCE TO RELATED APPLICATION

This application claims the benefit of Korean Application No. 98-13317 filed Apr. 14, 1998, in the Korea Industrial Property Office, the disclosure of which is hereby incorporated by reference.

BACKGROUND OF THE INVENTION

The present invention relates to an optical pickup having a catadioptric objective lens.

There are various methods under study for increasing recording capacity of an optical recording and reproducing apparatus through reducing the size of a focused spot by decreasing the wavelength of light and increasing a numerical aperture (NA) of an objective lens.

FIG. 1 is a conceptual diagram of a conventional optical focusing system which is used as an objective lens for an optical disk 4 and generates a near field to reduce the size of a focused spot on the disk 4. The conventional optical focusing system includes a conventional aspherical lens 1 and a spherical lens 2. The spherical lens 2 is typically called a solid immersion lens. A slider 3 is located between the spherical lens 2 and the disk 4 to load and move the objective lens thereon. The slider 3 moves the spherical lens 2 with respect to the surface of the disk 4 while maintaining a set distance between the spherical lens 2 and the disk 4 of less than 100 nm.

The aspherical lens 1 refracts the laser light emitted from a light source (not shown). The spherical lens 2 focuses the laser light refracted by the aspherical lens 1 on an inner surface (that surface located toward the disk 4) of the spherical lens 2. The inner surface of the spherical lens 2, on which the laser light is focused, forms a near field. As a result, information may be recorded on the disk 4 or read from the disk 4, via the near field.

When the spherical lens 2 is formed of a material having a refractive index "n," an angle at which the laser light is focused on the inner surface of the spherical lens 2 becomes large, and the momentum of the laser light is reduced. As a result, an effect of reducing the wavelength of the laser light to $\lambda/n$ is generated. Thus, the NA is increased to $NA/\lambda$. Therefore, the size of the focused spot which is finally formed in the surface of the spherical lens 2 is proportional to $1/n^2$. Accordingly, the size of the spot can be reduced by fabricating the spherical lens 2 using a material having a refractive index different from the refractive index "n."

However, as the aspherical lens 1 and the spherical lens 2 are separately manufactured, it is difficult to assemble and adjust an optical focusing system having the desired optical features. Since the optical focusing system needs an incident laser light having a beam diameter greater than or equal to 3 mm, the size of all optical components, including a light receptor, is quite large. When an incident laser beam slants off a normal angle with respect to the optical disk, due to vibration of a moving optical pickup or a rotating optical disk, it is difficult to accurately record or reproduce signals. The shortest wavelength of the light from currently available laser diode light sources is about 600 nm, while the NA of the objective lenses is approximately 0.6. Thus, when an NA greater than or equal to 0.6 is needed, the performance of the optical pickup is very sensitive to the incident beam slant. As a result, it is difficult to use conventional optical focusing systems in commercial optical recording and reproducing apparatus.

SUMMARY OF THE INVENTION

Accordingly, it is an object of the present invention to provide an optical pickup having a catadioptric objective lens having an excellent performance with respect to an incident beam slant.

It is also an object of the present invention to provide an optical pickup having a catadioptric objective lens enabling a reduction of the size of a focused spot.

It is yet a further object of the present invention to provide an optical pickup with lightweight compact optical components Additional objects and advantages of the invention will be set forth in part in the description which follows, and, in part, will be obvious from the description, or may be learned by practice of the invention.

To accomplish the above objects of the present invention, there is provided an optical pickup for recording and reproducing information on a recording medium using a near field, the optical pickup having a unit for emitting laser light to a recording medium and detecting the light reflected from the recording medium, and a catadioptric objective lens including a first reflective area for reflecting the light incident from the unit, a focusing area on which the light incident from the unit is focused as a focused spot, and a second reflective area for reflecting the light reflected from the first reflective area toward the focusing area, in which the first reflective area and the focusing area forms a first surface of the catadioptric objective lens and the second reflective area becomes a part of a second surface of the catadioptric objective lens located in the vicinity of the unit, wherein the unit and the catadioptric objective lens are integrated and the light from the unit is incident to the catadioptric objective lens via the portions of the catadioptric lens other than the second reflective area of the second surface.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
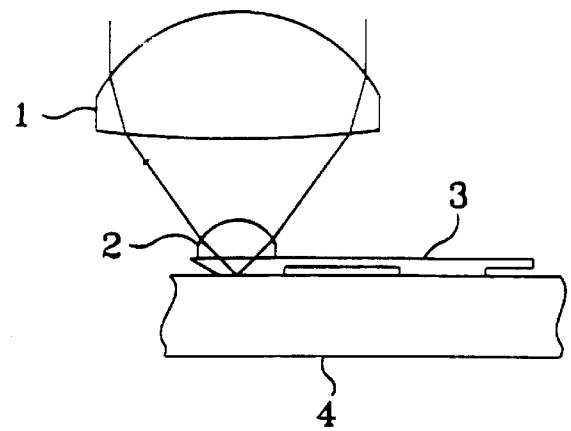
FIG. 1 is a diagram of a conventional optical focusing system.

Reference will now be made in detail to the present preferred embodiments of the present invention, examples of which are illustrated in the accompanying drawings, wherein like reference numerals refer to like elements throughout.

Figure 2:
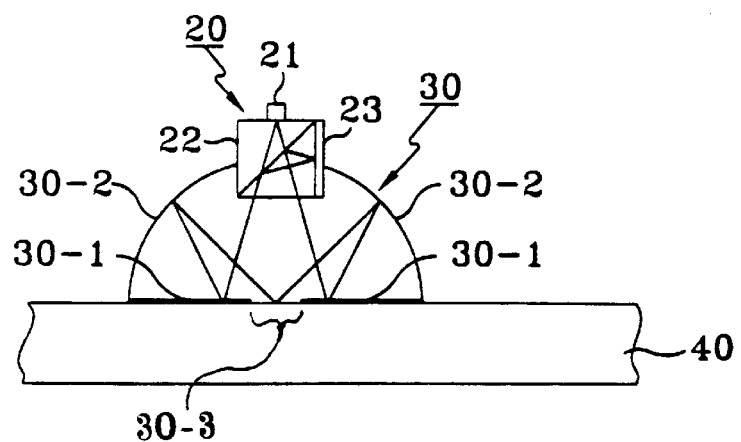
FIG. 2 is a diagram of an optical pickup system according to a first embodiment of the present invention.

FIG. 2 is a diagram of an optical system according to a first preferred embodiment of the present invention. The optical pickup system shown in FIG. 2, includes a unit 20 integrating a laser diode 21 (acting as a light source) and a photodiode 23 (acting as a light receptor) and a beam splitter 22 (preferably a prism). Accordingly, the unit 20 may also be referred to as an "integrated unit". A catadioptric objective lens 30 is located between the unit 20 and a disk 40. The catadioptric objective lens 30 focuses the light emitted from the laser diode 21 of the unit 20 on the disk 40 and transmits the light reflected from the disk 40 to the unit 20. In the first embodiment, the catadioptric lens 30 serves as a slider.

The objective lens 30 has a recess, or other suitable structure, on the opposite side of the catadioptric lens from the disk 40, for receiving and supporting the unit 20. This recess may be referred to as a "connection portion," as the unit 20 and the catadioptric objective lens 30 are connected. Note that being connected only connotes a fixed relationship there between, and one of ordinary skill in the art will recognize that the actual relationship will vary depending upon the construction of the unit 20 and the catadioptric objective lens 30. The beam splitter 22 and the catadioptric objective lens 30 are preferably fabricated using the same material having a desired refractive index.

Referring to FIG. 2, the laser light emitted from the laser diode 21 of the unit 20 is transmitted via the beam splitter 22 and is incident on the catadioptric objective lens 30 in a divergent form. As the beam splitter 22 and the catadioptric objective lens 30 are fabricated using the same material, the light from the laser diode 21 is incident to the catadioptric objective lens 30, without having refracted. For convenience of explanation, the surface of the catadioptric objective lens 30 facing the disk 40 is referred to as a first surface while the surface facing the laser light source is referred to as a second surface.

The catadioptric objective lens 30 includes a first reflective area 30-1 on the first surface, a focusing area 30-3 on which a focused spot is formed and a second reflective area 30-2 on the second surface. The second reflective area 30-2 comprises the entire second surface except that portion of the second surface contacting (or mated with) the unit 20. The second reflective area 30-2 is provided with an aspherical shape. The first surface of the catadioptric objective lens 30 transmits the light only at the focusing area 30-3 in the center portion of the first surface and reflects light toward the second reflective area 30-2 at all other areas.

The laser light reflected from the first reflective area 30-1 of the first surface and the second reflective area 30-2 of the second surface is focused on the focusing area 30-3 of the first surface in the form of a focused spot. The focused spot forms a near field. Therefore, information can be read from, and recorded on, the portion of the disk 40 located within a distance of one wavelength of the laser light from the focusing area 30-3 of the first surface. It is preferable that the distance between the first surface and the disk 40 is less than 100 nm.

During a reading operation, the near field formed by the catadioptric objective lens 30 is altered by an information recording layer on the disk 40. The reflected light representative of such alteration is reflected by the beam splitter 22 and is focused onto the photodiode 23.

Although the first embodiment of the present invention has been described with respect to a specific configuration, it will be recognized that the first embodiment is not limited to the specific configuration. For example, the laser diode 21 and the photodiode 23 in the unit 20 may be attached to the beam splitter 22 (as opposed to integrated) or even mounted as separate units spaced apart a predetermined distance.

Figure 3:
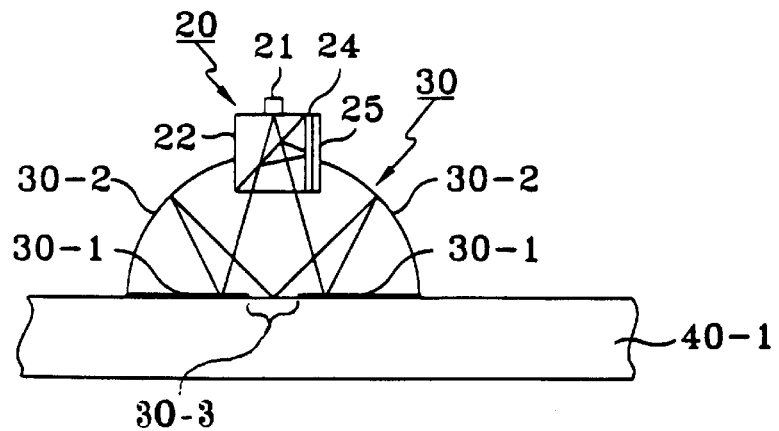
FIG. 3 is a diagram of an optical pickup system according to a second embodiment of the present invention.

FIG. 3 is a diagram of an optical pickup system according to a second preferred embodiment of the present invention. The optical system shown in FIG. 3 is obtained by modifying the optical system shown in FIG. 2 to create a unit 20-1 for use with a magneto-optical disk. Generally, a Wollaston prism 24 is placed between the beam splitter 22 and the photodiode unit 25. The Wollaston prism 24 separates reflected light from the magneto-optical disk 40-1 according to a polarization state of the reflected light. Further detailed description of the Wollaston prism 24 will be omitted in the interest of brevity as those of ordinary skill in the art are familiar with the properties of a Wallaston prism.

The photodiode unit 25 in which two photodiodes are packaged is used instead of the photodiode 23 so that two light beams separated by the wollaston prism 24 can be detected.

Otherwise, the elements of FIG. 3 having the same reference numerals as those of FIG. 2 perform the same functions as those of FIG. 2, such that a detailed description thereof will be omitted. The operations of the additional elements will be described below.

The light emitted from the laser diode 21 is focused on the magneto-optical disk 40-1 and the light reflected from the magneto-optical disk 40-1 is incident toward the beam splitter 22 along the same optical path as the focusing path. The beam splitter 22 reflects the incident light to the Wollaston prism 24. The Wollaston prism 24 splits the incident light and outputs two light beams to the photodiode 25. The photodiode 25 focuses the two light beams from the Wollaston prism 24, one each, onto pair of packaged photodiodes in the photodiode unit 25.

Although the second embodiment of the present invention has been described with respect to a specific configuration, it will be recognized that the second embodiment is not limited to the specific configuration. For example, the laser diode 21 and the photodiode unit 25 in the unit 20 may be attached to the beam splitter 22 (as opposed to integrated) or even mounted in separate units spaced apart a predetermined distance.

Although a few preferred embodiments of the present invention have been shown and described, it would be appreciated by those skilled in the art that changes may be made in these embodiments without departing from the principles and spirit of the invention, the scope of which is defined in the claims and their equivalents.

The preferred embodiments have been described where the unit 20 (or unit 20-1) and the objective lens 30 have the same refractive index. However, the unit 20 (or unit 20-1) and the objective lens 30 can be fabricated using different materials having different refractive indexes. The above embodiments teach that the objective lens 30 as functioning as a slider, similar to the slider shown in FIG. 1. However, a separate slider can be located between the objective lens 30 and the disk 40 or disk 40-1.

As described above, the present invention enables components of an optical pickup system to be lightweight and compact. The present invention also provides a thin optical pickup system which can be used in slim devices such as notebook computers.

What is claimed is:

1. An optical pickup that records and reproduces information on a recording medium using a near field, the optical pickup comprising:

an integrated unit that emits a laser light and detects light; and a catadioptric objective lens having a first surface facing the recording medium and a second surface, opposite the first surface, the first surface having a focusing area on which laser light is focused as a focused spot and a first reflective area surrounding said focusing area which reflects incident laser light, the second surface having a connection portion which is connected with the integrated unit and which receives the emitted laser light from the integrated unit and a second reflective area which reflects the laser light which is reflected from the first reflective area toward the focusing area.

2. The optical pickup according to claim 1, wherein the integrated unit comprises:
a light source which emits the laser light;
a detector which detects the laser light which is reflected from an information recording surface on the recording medium and transmitted through the catadioptric objective lens; and
an optical device which adjusts an optical path so that the light which is emitted from the light source is directed toward the catadioptric objective lens and the light which is reflected from the information recording surface through the catadioptric objective lens is directed toward the detector.

3. The optical pickup according to claim 2, wherein the light source is located on the optical axis of the catadioptric objective lens.

4. The optical pickup according to claim 3, wherein the optical device contacts with the connection portion of the catadioptric objective lens.

5. The optical pickup according to claim 4, wherein the light source is spaced apart from the optical device.

6. The optical pickup according to claim 4, wherein the detector is spaced apart from the optical device.

7. The optical pickup according to claim 4, wherein the light source and the detector are spaced apart from the optical device.

8. The optical pickup according to claim 1, wherein the recording medium is an optical disk.

9. The optical pickup according to claim 1, wherein the recording medium is a magneto-optical disk.

10. The optical pickup according to claim 9, wherein the integrated unit comprises:
a light source which emits the laser light;
a plurality of detectors which detect the laser light which is reflected from an information recording surface on the recording medium and transmitted through the catadioptric objective lens;
a beam splitter which splits the reflected light and outputs a beam of light to each of the plurality of detectors; and
an optical device which adjusts an optical path so that the light which is emitted from the light source is directed toward the catadioptric objective lens and the reflected light is directed toward the beam splitter.

11. The optical pickup according to claim 10, wherein the light source is located on the optical axis of the catadioptric objective lens.

12. The optical pickup according to claim 11, wherein the optical device contacts with the connection portion of the catadioptric objective lens.

13. The optical pickup according to claim 12, wherein the light source is spaced apart from the optical device.

14. The optical pickup according to claim 12, wherein the detector is spaced apart from the optical device.

15. The optical pickup according to claim 12, wherein the light source and the detector are spaced apart from the optical device.

16. The optical pickup according to claim 10, wherein the beam splitter is a wollaston prism.

17. The optical pickup according to claim 1, wherein the connection portion is a recess and the integrated unit and the catadioptric objective lens are mated with each other.

18. The optical pickup as claimed in claim 1 wherein said second reflective area is aspherical.

19. An optical pickup that records and reproduces information on a storage medium. comprising:
a light source which emits light;
a catadioptric lens which directs the emitted light onto the storage medium and directs the emitted light reflected by the storage medium away from the storage medium, the catadioptric lens including a first surface adjacent the storage medium, a second surface spaced apart from the first surface, and a connection portion on the second surface of the catadioptric lens;
a light detector which receives the reflected light: and
an optical system which contacts the connection portion of the catadioptric lens guides the emitted light into the catadioptric lens and guides the reflected light onto the detector.

20. The optical pickup according to claim 19, wherein the connection portion is a recess which extends into the catadioptric lens between the second surface and the first surface.

21. An optical pickup that records and reproduces information on a recording medium, the optical pickup comprising:
a light emitter which emits laser light;
a light detector which detects laser light;
an optical device which transmits the emitted light toward the recording medium and diverts light reflected from the recording medium to the detector; and
a lens, disposed between the optical device and the recording medium, the lens comprising:
a first surface facing the recording medium and a second surface, opposite the first surface, the first surface having a focusing area and a first reflective area surrounding said focusing area, the second surface having a reflection free structure which receives the optical device and a second reflective area surrounding said structure;
wherein the emitted laser light passes through the optical device and the reflection free structure and is reflected sequentially from the first reflective area and the second reflective area to form a near field focused spot in the focusing area and wherein light reflected from the recording medium is reflected sequentially from the second reflective area and the first reflective area into the optical device.

22. The optical pickup as claimed in claim 21 wherein the optical device and the lens have the same index of refraction.

23. The optical pickup as claimed in claim 21 wherein the optical device and the lens have different indices of refraction.

24. The optical pickup according to claim 21 wherein the structure which receives the optical device is a recess which extends into the lens between the second surface and the first surface.

25. The optical pickup according to claim 21 wherein the optical device, the light emitter, and the light detector are integrated as a unit.

26. The optical pickup according to claim 21 wherein the optical device and the light detector are integrated as a unit and the light emitter is spaced apart from the integrated unit.

27. The optical pickup according to claim 21 wherein the optical device and the light emitter are integrated as a unit and the light detector is spaced apart from the integrated unit.

28. The optical pickup according to claim 21 wherein the light detector further comprises a plurality of detectors and the optical pickup further comprises a beam splitter which splits the recording medium reflected light and outputs respective beams of light to each of the plurality of detectors, wherein the light emitter, the plurality of detectors, the optical device and the beam splitter are integrated as a unit.

29. The optical pickup according to claim 28 wherein the beam splitter is a Wollaston prism.

30. The optical pickup according to claim 21 wherein the light detector further comprises a plurality of detectors and the optical pickup further comprises a beam splitter which splits the recording medium reflected light and outputs respective beams of light to each of the plurality of detectors, wherein the plurality of detectors, the optical device and the beam splitter are integrated as a unit and the light emitter is spaced apart from the integrated unit.

31. The optical pickup according to claim 21 wherein the light detector further comprises a plurality of detectors and the optical pickup further comprises a beam splitter which splits the recording medium reflected light and outputs respective beams of light to each of the plurality of detectors, wherein the light emitter, the optical device and the beam splitter are integrated as a unit and the plurality of detectors is spaced apart from the integrated unit.

32. An optical pickup that records and reproduces information on a storage medium, the optical pickup comprising:
  a catadioptric lens which directs light to and from the storage medium; and
  an integrated unit mated with the catadioptric lens which supplies light to the catadioptric lens and which detects light reflected by the storage medium the integrated unit comprising:
    a laser diode which emits the light,
    a photodiode which detects the reflected light, and
    a beam splitter which passes the emitted light to the catadioptric lens and directs the reflected light from the catadioptric lens to the photodiode.

33. An optical pickup that records and reproduces information on a recording medium, the optical pickup comprising:
  a light emitter which emits laser light;
  a light detector which detects laser light; and
  a lens, comprising:
  a first surface facing the recording medium and a second surface, opposite the first surface, the first surface having a focusing area and a first reflective area, the second surface having a second reflective area, the second surface and the second reflective area having a reflection free structure which transmits the laser light, the first surface positioned within one wavelength of the laser light from the recording medium,
  wherein the emitted laser passes through the optical device and the reflection free structure and is reflected sequentially from the first reflective area and the second reflective area to form a focused spot in the focusing area and wherein light reflected from the recording medium is reflected sequentially from the second reflective area and the first reflective area into the optical device wherein the light reflected from the recording medium is diverted toward the light detector.

34. The optical pickup as claimed in claim 33, wherein the first surface is positioned within 100 nm of the recording medium.

* * * * *